(12) United States Patent
Bao et al.

(10) Patent No.: US 7,995,559 B2
(45) Date of Patent: Aug. 9, 2011

(54) SYSTEM AND METHOD FOR INTERWORKING COMMUNICATION PROTOCOLS TO PROVIDE SUPPLEMENTARY SERVICES

(75) Inventors: Ho Bao, Richardson, TX (US); Joanna J. Chen, Plano, TX (US); Stephen S. Hua, Plano, TX (US); Shipeng Li, Plano, TX (US); Ping Ni, Arlington, TX (US); Christopher E. Pearce, Dallas, TX (US); Yao Zhu, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 813 days.

(21) Appl. No.: 11/363,853

(22) Filed: Feb. 27, 2006

(65) Prior Publication Data
US 2007/0201480 A1 Aug. 30, 2007

(51) Int. Cl.
*H04L 12/66* (2006.01)
*H04L 12/56* (2006.01)
*H04J 3/16* (2006.01)

(52) U.S. Cl. ...................................... 370/352; 370/467

(58) Field of Classification Search .......... 370/352–356, 370/466–467, 395.2–395.21, 392, 410, 236
See application file for complete search history.

(56) References Cited

U.S. PATENT DOCUMENTS

| | | | |
|---|---|---|---|
| 3,963,874 A | 6/1976 | Pommerening et al. | 179/18 AB |
| 4,809,321 A | 2/1989 | Morganstein et al. | 379/211 |
| 6,501,750 B1 | 12/2002 | Shafer et al. | 370/352 |
| 6,510,162 B1 | 1/2003 | Fijolek et al. | 370/432 |
| 6,546,087 B2 | 4/2003 | Shaffere et al. | 379/90.01 |
| 6,567,505 B1 | 5/2003 | Omori et al. | 379/84 |
| 6,601,099 B1 | 7/2003 | Corneliussen | 709/224 |
| 6,614,899 B1 | 9/2003 | Sollee et al. | 379/218.01 |
| 6,615,236 B2 | 9/2003 | Donovan et al. | 709/203 |
| 6,625,141 B1 | 9/2003 | Glitho et al. | 370/352 |
| 6,636,594 B1 | 10/2003 | Oran | 379/201.01 |
| 6,658,095 B1 | 12/2003 | Yoakum et al. | 379/93.01 |
| 6,661,799 B1 | 12/2003 | Molitor | 370/401 |
| 6,665,723 B2 | 12/2003 | Trossen | 709/227 |
| 6,678,735 B1 | 1/2004 | Orton et al. | 709/230 |
| 6,684,147 B2 | 1/2004 | Park et al. | 701/71 |

(Continued)

OTHER PUBLICATIONS

Ackermann et al. "An Open Source H.323-SIP Gateway as Basis for Supplementary Service Interworking", 2001, Proceedings of the 2$^{nd}$ IP Telephony Workshop, New York.*

(Continued)

*Primary Examiner* — Chirag G Shah
*Assistant Examiner* — Jenkey Van
(74) *Attorney, Agent, or Firm* — Baker Botts L.L.P.

(57) ABSTRACT

In one embodiment of the present invention, a method is provided for redirecting a session established between two endpoints. In such an embodiment, the method comprises receiving a SIP request to redirect the session to a third endpoint; dissociating the two endpoints; suspending a media session between the endpoints; connecting a signaling session between one endpoint and a third endpoint; and connecting the media session. In an alternative embodiment, a method is provided for referring a first endpoint to a second endpoint outside of an established dialog. In such an embodiment, the method comprises receiving a SIP REFER request specifying a uniform resource indicator associated with the second endpoint as a target; identifying a protocol associated with each endpoint; initiating a session with the first endpoint using an appropriate protocol; receiving media control information from the first endpoint; and connecting the session to the second endpoint using an appropriate protocol.

22 Claims, 6 Drawing Sheets

U.S. PATENT DOCUMENTS

| | | | | |
|---|---|---|---|---|
| 6,731,625 | B1 | 5/2004 | Eastep et al. | 370/352 |
| 6,738,390 | B1 | 5/2004 | Xu et al. | 370/467 |
| 6,754,181 | B1 | 6/2004 | Elliott et al. | 370/252 |
| 6,760,322 | B1 | 7/2004 | Fukuda et al. | 370/352 |
| 6,785,246 | B2 | 8/2004 | Foti | 370/261 |
| 6,788,676 | B2 | 9/2004 | Partanen et al. | 370/352 |
| 6,885,658 | B1* | 4/2005 | Ress et al. | 370/352 |
| 6,937,597 | B1* | 8/2005 | Rosenberg et al. | 370/356 |
| 2003/0007497 | A1* | 1/2003 | March et al. | 370/410 |
| 2003/0177099 | A1* | 9/2003 | Gallant et al. | 705/52 |
| 2005/0021872 | A1* | 1/2005 | Poustchi et al. | 709/250 |
| 2005/0105511 | A1* | 5/2005 | Poikselka | 370/352 |
| 2006/0007954 | A1 | 1/2006 | Agrawal et al. | 370/466 |

OTHER PUBLICATIONS

Sparks, R. "RFC 3515: The Session Initiation Protocol (SIP) Refer Method", Apr. 2003.*

Ackermann et al. "An Open Source H.323-SIP Gateway as Basis for Supplementary Service Interworking", 2001, Proceedings of the 2nd IP Telephony Workshop, New York.*

Mahy, R. "RFC 3891: The Session Initiation Protocol (SIP) "Replaces" Header", Sep. 2004.*

ITU-T H.450.2 "Draft New Recommendation H.450.2 (Determined) Call Transfer Suplementary Service for H.323", Sep. 1997.*

J. Rosenberg, H. Schulzrinne, G. Camarillo, A. Johnston, J. Peterson, R. Sparks, M. Handley, and E. Schooler, "SIP: Session Initiation Protocol ," Network Working Group, RFC 3261, 269 pages, Jun. 2002.

H. Schulzrinne et al., "RTP Payload for DTMF Digits, Telephony Tones and Telephony Signals," *The Internet Society*, http://tools.ietf.org/html/rfc2833, May 2000, 29 pages.

A. B. Roach, "Session Initiation Protocol (SIP)—Specific Event Notification," *The Internet Society*, http://www.ietf.org/rfc/rfc3265.txt, Jun. 2002, 36 pages.

J. Rosenberg et al., "An Offer/Answer Model with the Session Description Protocol (SDP)," *The Internet Society*, http://www.ietf.org/rfc/rfc3264.txt, Jun. 2002, 24 pages.

J. Rosenberg et al., "Caller Preferences for the Session Initiation Protocol (SIP)," *The Internet Society*, http://www.ietf.org/rfc/rfc3841.txt, Aug. 2004, 25 pages.

H. Schulzrinne, "Session Initiation Protocol (SIP)—H.323 Interworking Requirements," *The Internet Society*, http://www.ietf.org/rfc/rfc4123.txt, Jul. 2005, 15 pages.

R. Mahy et al., "Remote Call Control in SIP using the REFER method and the session-oriented dialog package," Internet Draft (no longer posted on Internet), The Internet Society, 35 pages, Feb. 2004.

R. Mahy et al., "Remote Call Control in Session Initiation Protocol (SIP) using the REFER method and the session-oriented dialog package," Internet Draft, http://www.ietf.org/internet-drafts/draft-mahy-sip-remote-cc-03.txt, The Internet Society, 14 pages, Mar. 5, 2006.

R. Mahy, et al., "The Session Initiation Protocol (SIP) 'Join' Header," The Internet Society, RFC 3991, http://www.ietf.org/rfc/rfc3911.txt, 15 pages, Oct. 2004.

R. Mahy, et al., "The Session Initiation Protocol (SIP) 'Replaces' Header," The Internet Society, RFC 3891, http://www.ietf.org/rfc/rfc3891.txt, 15 pages, Sep. 2004.

M. Soroushnejad, et al. "Implementing Bridged Line Appearances (BLA) Using Session Initiation Protocol (SIP)," Internet Draft http://bgp.potaroo.net/ ietf/html/ids/draft-anil-sipping-bla-03.txt, 33 pages, Jun. 15, 2006.

J. Rosenberg et al., "An INVITE Initiated Dialog Event Package for the Session Initiation Protocol (SIP)," RFC 4235, http://ietfreport.isoc.org/idref/draft-ietf-sipping-dialog-package-06.txt, 38 pages, Apr. 12, 2005.

* cited by examiner

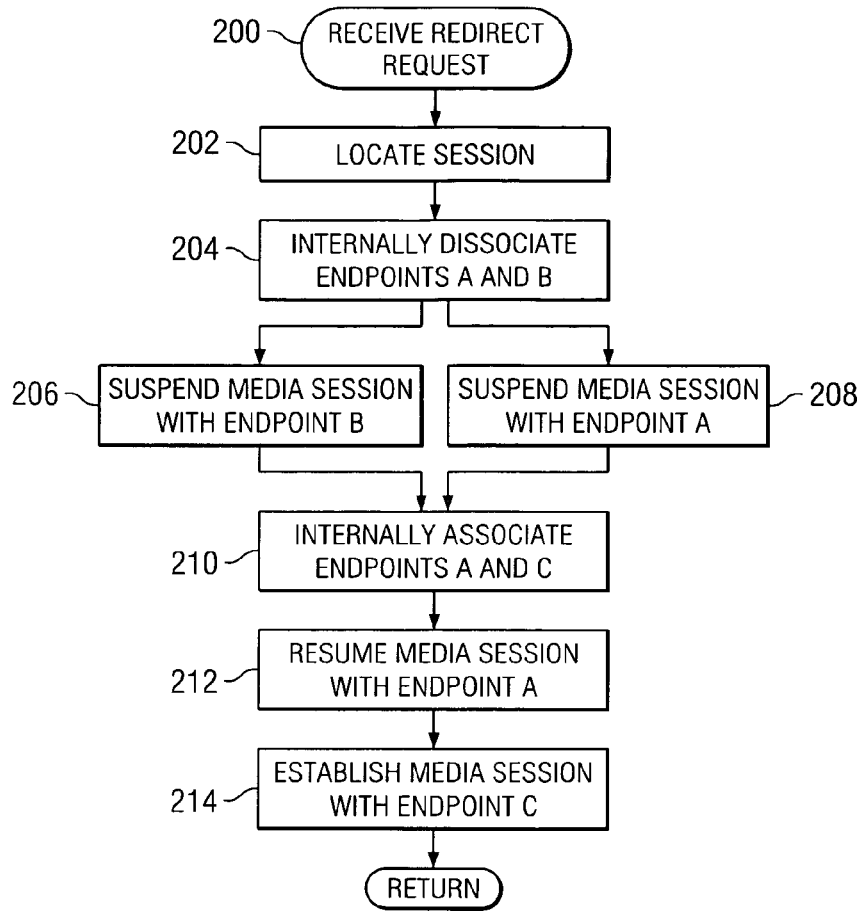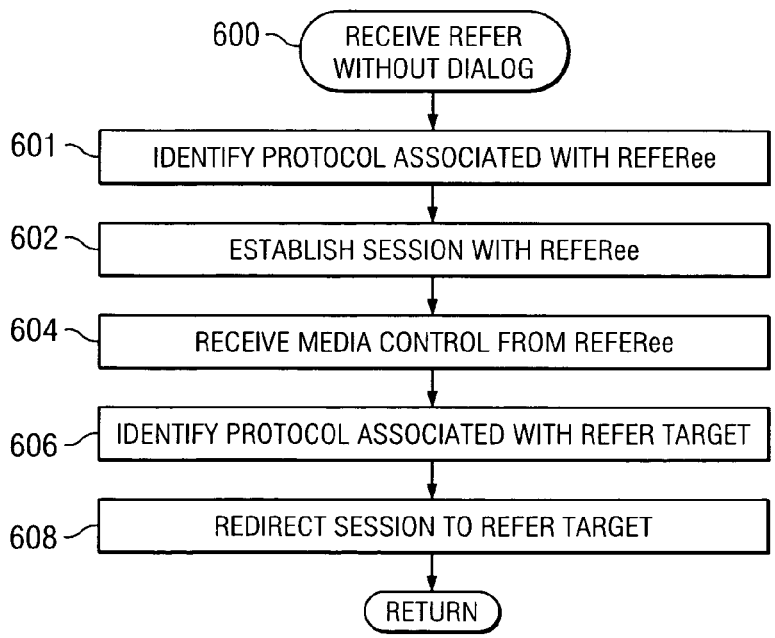

FIG. 3

```
EP A(H.323)        CCM                         EP B (SIP)              EP C(SIP)

<==========Connected/Media==========>
                    <=======INVITE A(C SDP) /Replaces======  ⟋S1
                    ========100 Trying=============>
            <dissociate A/B> ⟋300
            <suspend media>
            (flows are independent)
<======ECS==========  ⟋H1
<======CLC==========  ⟋H2
======ECSAck=======>  ⟋H3
======CLCA========>   ⟋H4
======CLC=========>   ⟋H5
<======CLCA=======>   ⟋H6

== INVITE (inactive) ======>  ⟋S3
                    <= 200 OK (inactive) ======   ⟋S4
                    == ACK ============>          ⟋S5
            <end suspend media>

<associate A/C>  ╲302
                    <resume media>
                    <associate A/C>

<==TCS (C caps)=== ╲H7
===TCS (A caps)==> ╲H8
===TCSAck ====>    ╲H9
<==TCSAck =====    ╲H10
===MSD =====>      ╲H11
<==MSDA======      ╲H12
===MSDA=====>      ╲H13
===OLC======>      ╲H14
<==OLC=======      ╲H15
<==OLCA(C)=====    ╲H16
===OLCA(A)====>    ╲H17

S6 ⟋ ==========200 OK(A)==============>
                    =====BYE======> ╲S7
                    <===200 OK ===== ╲S8
<===============Connect/Media===============>
```

FIG. 4B

```
H.323-A                    CCM                    SIP-B                    SIP-C

<==========Connected/Media===========>

<========REFER=======  ╱─S1
                           ========202========>

<dissociate A/B>
                    <suspend A/B media>
                    (media exchanges are independent)

<=====ECS==========
<=====CLC==========
======ECSAck======>
======CLCA=======>
======CLC========>
<=====CLCA=======>

== INVITE (inactive) ======>
                           <= 200 OK (inactive) ======
                           == ACK ============>

<end suspension>
                    <associate A/C)

======= INVITE =============>  ╱─S6
                           <====== 200 OK(C SDP) ========

=== NOTIFY ========>
                           <== 200 OK ========

<==TCS (C caps)===
====TCS (A caps)==>
====TCSAck=====>
<==TCSAck =====
===MSD ======>
<==MSDA======
===MSDA======>
===OLC======>
<==OLC=======
<==OLCA(C)=====
====OLCA(A)====>

========== ACK (A SDP) =========>

<==========Connect/Media==========>

<== BYE =======
                           === 200 OK =====>
```

SYSTEM AND METHOD FOR INTERWORKING COMMUNICATION PROTOCOLS TO PROVIDE SUPPLEMENTARY SERVICES

TECHNICAL FIELD OF THE INVENTION

This invention relates in general to communications, and more particularly to a system and method for interworking communication protocols to provide supplementary services.

BACKGROUND OF THE INVENTION

The field of communications has become increasingly important in today's society. In particular, the ability to quickly and effectively interact with an individual (through any suitable communications media) presents a significant obstacle for component manufacturers, system designers, and network operators. This obstacle is made even more difficult due to the plethora of diverse communication technologies that exist in the current marketplace.

As new communication architectures (such as the Session Initiation Protocol (SIP) and the Voice over Internet Protocol (VoIP)) become available to the consumer, new processes need to be developed in order to optimize this emerging technology. For example, many environments provide little or no interoperability between communication protocols, which may limit the availability of advanced calling features to the consumer. In order to deliver a sustainable product that can compete with conventional architectures, developers need a means for enabling advanced calling features through protocol interoperability.

SUMMARY OF THE INVENTION

In accordance with the present invention, the disadvantages and problems associated with the interoperability of protocols to deliver advanced calling features have been substantially reduced or eliminated.

In accordance with one embodiment of the present invention, a method is provided for redirecting a session established between a first endpoint and a second endpoint, wherein the first endpoint and the second endpoint are associated in a communication platform. In such an embodiment, the method comprises receiving a SIP request to redirect the session to a third endpoint; dissociating the first endpoint from the second endpoint; suspending a media session between the first endpoint and the second endpoint; connecting a signaling session between the first endpoint and the third endpoint; and connecting the media session between the first endpoint and the third endpoint.

In accordance with another embodiment of the present invention, a method is provided for referring a first endpoint to a second endpoint outside of an established dialog. In such an embodiment, the method comprises receiving a SIP REFER request comprising a first uniform resource indicator associated with the first endpoint and a Refer-to header specifying a second uniform resource indicator associated with the second endpoint as a target; identifying a first protocol associated with the first uniform resource indicator; initiating a session with the first endpoint using the first protocol; receiving media control information from the first endpoint; identifying a second protocol associated with the second uniform resource indicator; and connecting the session to the second endpoint using the second protocol.

Important technical advantages of certain embodiments of the present invention include the interoperability between protocols in a heterogeneous communication environment, which enables the delivery of advanced calling features.

Other technical advantages of the present invention may be readily apparent to one skilled in the art from the following figures, descriptions, and claims. Moreover, while specific advantages may have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 2 is a call flow diagram that illustrates one embodiment of the present invention;

FIGS. 3-5 are call flow diagrams that illustrate example operations of a certain embodiment of the present invention; and FIG. 6 is a call flow diagram that illustrates an alternative embodiment of the present invention.

DETAILED DESCRIPTION OF THE INVENTION

For purposes of teaching and discussion, it is useful to provide an overview of a communication system in which certain features of the present invention may be implemented. The following foundational information may be viewed as a basis from which the present invention may be properly explained. Such information is offered earnestly for purposes of explanation only and, accordingly, should not be construed in any way to limit the broad scope of the present invention and its potential applications.

Figure 1:
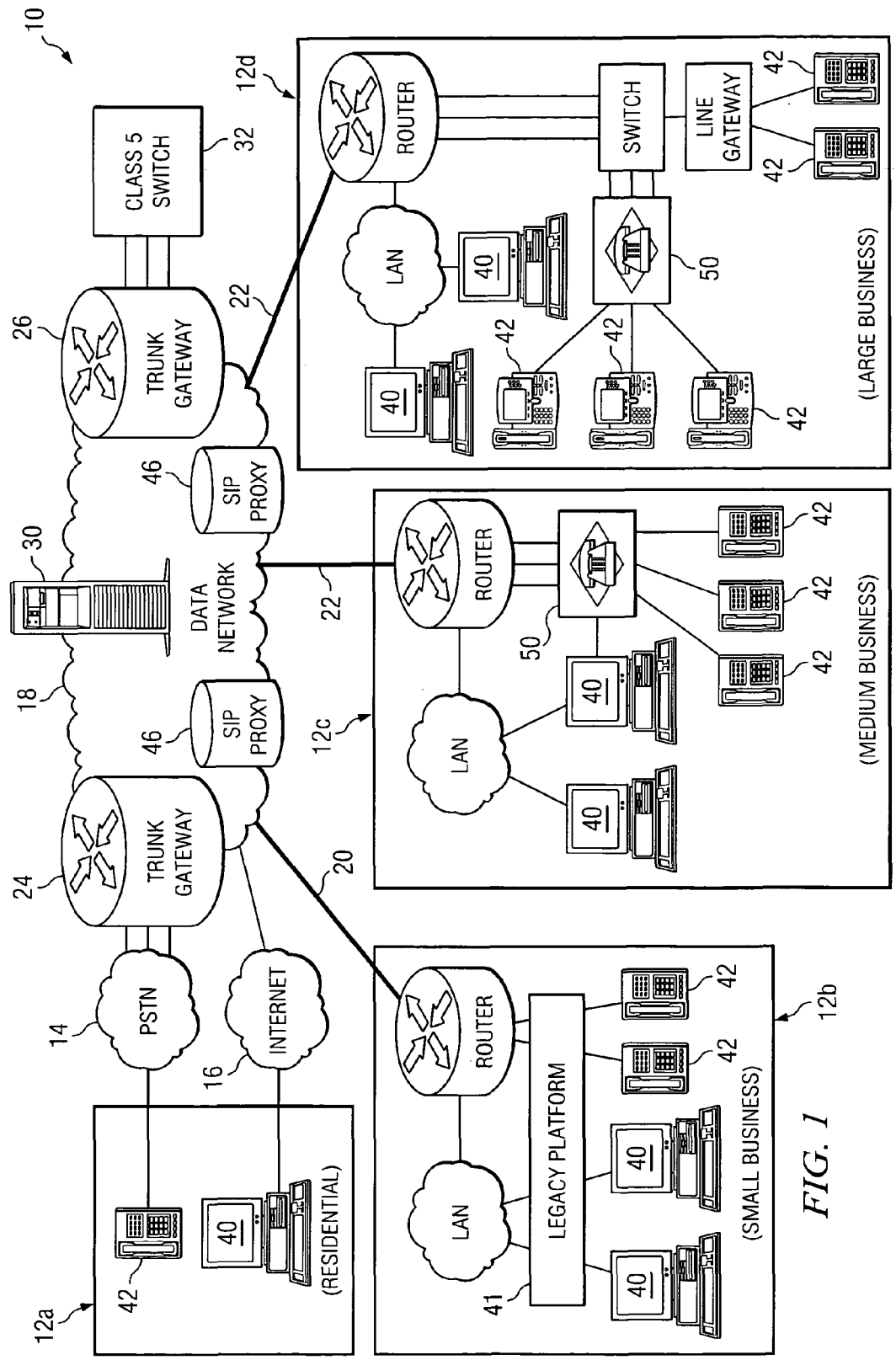
FIG. 1 is a simplified block diagram of a communication system for exchanging data in accordance with certain teachings of the present invention.

FIG. 1 is a simplified block diagram of a communication system 10 for exchanging data in accordance with certain teachings of the present invention. Communication system 10 includes domains 12a-12d, a public switched telephone network (PSTN) 14, a wide-area network 16 (such as the Internet), a data network 18, a broadband access link 20, and a number of additional links 22. Additional links 22 may include, for example, a digital subscriber line (DSL) link, a T1 link, a fiber optic link, or a wireless link. Communication system 10 also includes a set of trunk gateways 24 and 26, a third-party application server 30, and a Class-5 switch 32, and may include SIP proxies 46.

Each domain may include suitable network equipment and appropriate infrastructure (e.g., switches, routers, LANs, gateways, etc.) to facilitate a communication session. Domain 12a represents a residential location, which consists of a computer 40 and a telephone 42. Telephone 42 may be an Internet protocol (IP) telephone or a standard telephone operable to interface with computer 40 such that one or more calling capabilities are enabled through telephone 42. Accordingly, two types of telephones are illustrated in FIG. 1. Domain 12b represents a small business entity, which consists of a local area network (LAN), a router, several computers 40, and several telephones 42. In addition, domain 12b may include a legacy platform 41, which is operable to communicate with each telephone 42 and/or computer 40.

Domain 12c represents a medium business entity, which consists of a LAN, router, a private branch exchange (PBX) or key system, several computers 40, and several telephones 42. Domain 12d is a large business entity, which consists of a LAN, a router, a switch, a line gateway, several computers 40, and several telephones 42. Note that domains 12c and 12d each include a communications platform 50, which is operable to communicate with any number of "endpoints" (e.g., telephones 42 and/or computer 40). In one embodiment, communications platform 50 is a Call Manager element, which is manufactured by Cisco Systems, Inc. of San Jose, Calif. In other embodiments, communications platform 50 may be any suitable unit operable to interface with end-user devices (e.g., telephone 42, computer 40, etc.).

Note that the term "endpoint" encompasses a myriad of potential devices and infrastructure that may benefit from the operations of communication system 10. Endpoints may represent a personal digital assistant (PDA), a cellular telephone, a standard telephone (which may be coupled to a personal computer), an IP telephone, a personal computer, a laptop computer, a mobile telephone, or any other suitable device or element (or any appropriate combination of these elements) that is operable to receive data or information. FIG. 1 illustrates only one set of example devices that may be used within communication system 10. The present invention is replete with numerous alternatives that could be used to facilitate the operations of communication system 10.

It should also be noted that the internal structure of the endpoints are malleable and can be readily changed, modified, rearranged, or reconfigured in order to achieve their intended operations, as they pertain to certain features of the present invention. Note also that the endpoints can each include a link to communications platform 50, which is operable to communicate with any number of endpoints/user agents/devices. As indicated above, in one embodiment, communications platform 50 may be a Call Manager element, which is manufactured by Cisco Systems, Inc. of San Jose, Calif. The Call Manager element is SIP-enabled, and it can readily accommodate other protocols (e.g., H.323). In other embodiments, communications platform 50 is any suitable component (e.g. a gateway, a switch, a router, a bridge, a state machine, a processor, etc.) that is operable to interface with endpoints/end-users.

As outlined above, software and/or hardware may reside in communications platform 50 in order to achieve certain teachings of the present invention. However, due to its flexibility, communications platform 50 may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of communications platform 50 in the context of communication system 10 and, accordingly, it should be construed as such.

Endpoints in communication system 10 communicate implement various communication protocols, which may include may include the Session Initiation Protocol (SIP) and the H.323 protocol. As used herein, then, the term "SIP endpoint" refers to any endpoint that implements the SIP protocol, and the term "H.323 endpoint" refers to any endpoint that implements the H.323 protocol.

In certain embodiments, the present invention may comprise a SIP-to-H.323 signaling gateway capable of receiving a SIP request from one endpoint to redirect an established media session to an alternate endpoint. In general, a SIP request for redirecting a media session comprises an INVITE request with a "replaces" header, or a REFER method. Session redirection is useful in transactions intended to cause a first party that has been communicating with a second party to begin communicating with a third party within the context of the same call.

For instance, in certain embodiments of communication system 10, if endpoint A desires to communicate with endpoint B, endpoint A first initiates a signaling session with communication platform 50. Communication platform 50 may then initiate a signaling session with endpoint B and forward signaling messages from endpoint A to endpoint B, and vice versa, until the signaling session reaches an established state. Once endpoint A and endpoint B have established a signaling session (or perhaps during the establishment, depending on the protocol), endpoint A and endpoint B exchange information relating to the addresses at which they are prepared to receive a media stream. If endpoint B decides that endpoint A needs to communicate with another endpoint (endpoint C) within the context of the same signaling session, endpoint B may redirect the media stream from endpoint A to endpoint C. From a feature level perspective, redirect operations may include, but are not limited to, call transfer, immediate divert, and ad hoc conferencing. SIP methods such as INVITE/Replaces or REFER/Replaces or REFER might be used to redirect the media stream.

According to SIP standards, communication platform 50 accomplishes this redirection by forwarding the SIP request to endpoint A, and endpoint A then executes a set of procedures consistent with the SIP standards to effect the INVITE/Replaces, REFER, or REFER/Replaces. The role of communication platform 50 in these scenarios is to simply forward the message, a role that the SIP standards describe as a "Proxy Server."

Certain embodiments of communication platform 50, though, implement an alternate strategy for redirecting sessions. Cisco's Call Manager (CCM), for example, intercepts a request and attempts to effect an operation that yields similar results to the SIP standard proxy version. CCM effects these operations by using protocol-specific primitives to suspend the media session between endpoint A and endpoint B while retaining the signaling session; optionally establishing a signaling session to any new endpoints not being managed by CCM (as might happen if CCM issues a call to endpoint C as the result of an immediate divert); using protocol-specific primitives to reestablish media session between the redirected endpoint (endpoint A) and the new endpoint (endpoint C), while retaining the original endpoint-A-to-CCM signaling session; and optionally sending new information in the signaling session to refresh the display information associated with endpoint A's session.

In certain embodiments, CCM accomplishes these tasks through an abstraction model, which consists of four relevant pieces: a set of device objects that act as centralized points and consolidate all call signaling and media control messaging on behalf of specific endpoints; a call control layer, which coordinates the bridging of signaling sessions between device objects and exposes a set of primitives that permits endpoints in a call signaling session to be associated or dissociated; a media control layer, triggered by the call control layer, which coordinates the establishment, suspension, resumption, and termination of media streams between two associated endpoints; and a feature layer, which uses the exposed call control primitives to meet the requirements of a particular end-user feature. Note that these abstractions are merely one way to decompose the problem, and other embodiments of the present invention may use a different internal abstraction model.

FIG. 2 is a call flow diagram that illustrates one embodiment of the present invention. In FIG. 2, communication platform 50 is a CCM. Moreover, FIG. 2 assumes that endpoint A has established a communication session with endpoint B, but the means by which endpoint A and endpoint B have established the session is irrelevant. CCM manages the session. As used here, a "communication session" comprises a signaling session and a media session. Internally, CCM maintains an association between two endpoints having an established signaling session. Thus, with respect to the example of FIG. 2, CCM initially associates endpoint A and endpoint B. Endpoint B initially sends a request to redirect the session to endpoint C. In steps 200-04, CCM receives the request, locates the session associated with the request, and disassociates endpoint A and endpoint B. At steps 206 and 208, CCM suspends the media session with endpoint A and endpoint B. CCM then associates endpoint A with endpoint C (step 210), and resumes the media session with endpoint A (step 212). Finally, CCM establishes a media session with endpoint C (step 214), thereby connecting a session between endpoint A and endpoint C, as requested.

Figure 4A:
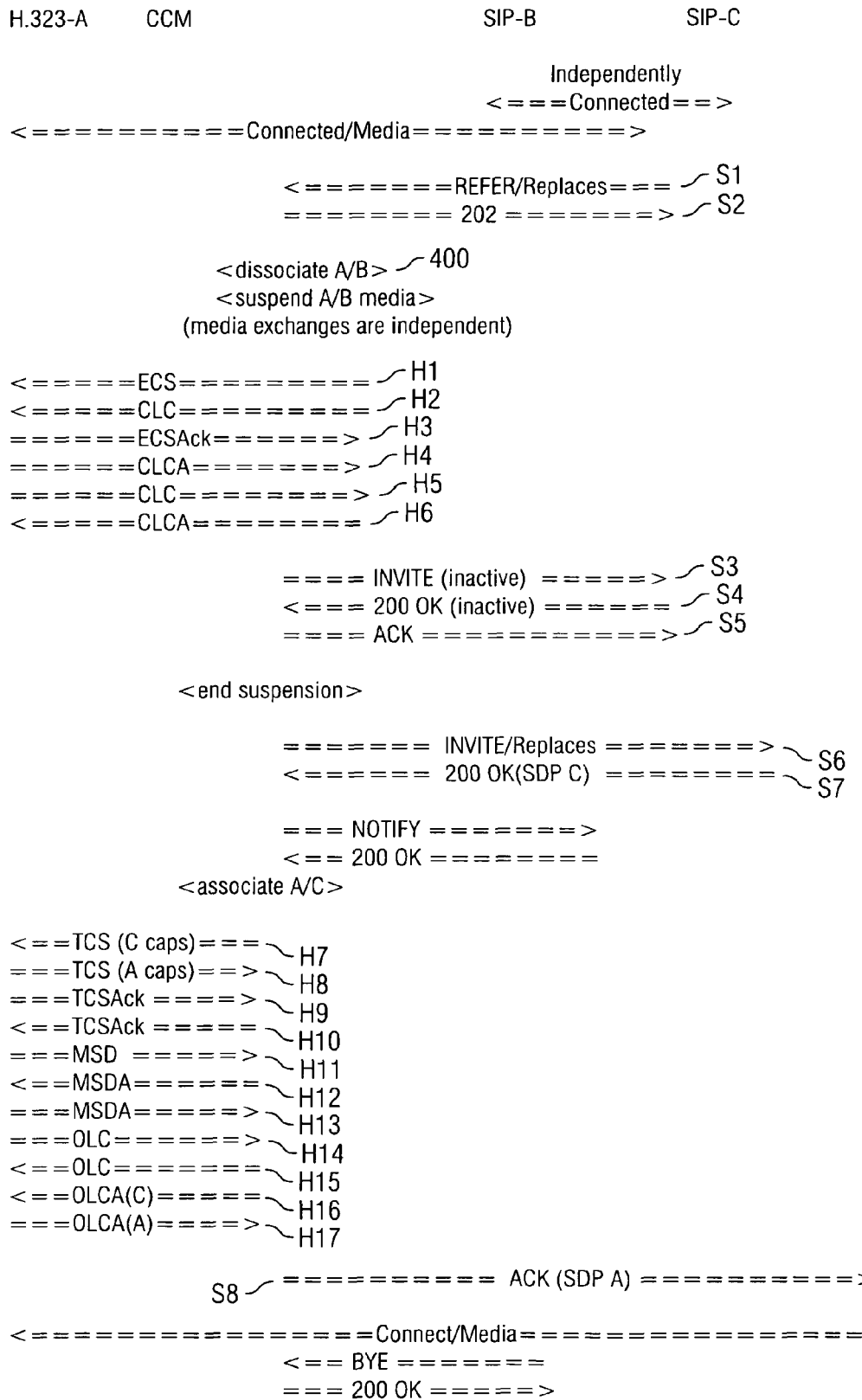
Figure 5:
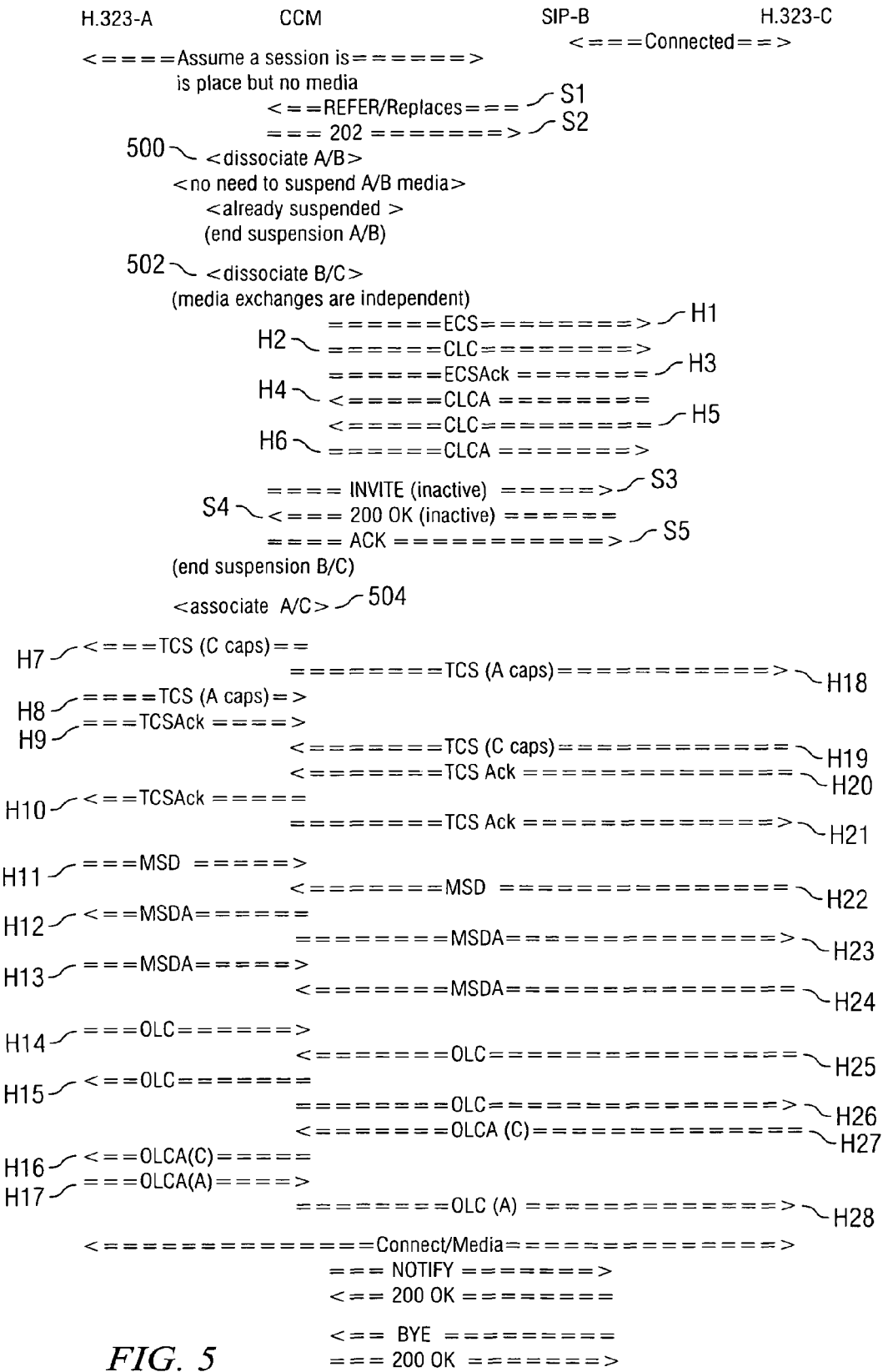

FIGS. 3-5 are call flow diagrams that illustrate example operations of the embodiment described above with reference to FIG. 2. These example operations highlight some of the advantages of the present invention, but do not limit the scope of the invention. In FIGS. 3-5, communication platform 50 is a CCM and endpoint A is an H.323 endpoint that implements the H.245 standard for media control. H.245 media messages for suspension and resumption of a session in FIGS. 3-5 may include an Empty Capability Set (ECS) message containing an empty set of codecs, an ECS Acknowledgement (ECSAck) message, a Terminal Capability Set (TCS) message specifying codecs, a TCS Acknowledgement (TCSAck) message, a Master/Slave Determination (MSD), an MSD Acknowledgement (MSDA), an Open Logical Channel (OLC) message, an OLC Acknowledgement (OLCA), a Close Logical Channel (CLC), or a CLC Acknowledgement (CLCA).

FIG. 3 is a call flow diagram that illustrates an example operation in which CCM receives a SIP INVITE request with a Replaces header. In FIG. 3, endpoint B and endpoint C are both SIP endpoints. In this example, INVITE request S1 specifies an existing dialog to replace. CCM finds the session associated with the specified dialog and internally dissociates endpoint A and endpoint B (step 300). CCM then suspends the media session with endpoint A (H1-H6), and with endpoint B (S3-S5). At step 302, CCM internally associates endpoint A with the new dialog from endpoint C, and resumes the media session with endpoint A (H7-H18). CCM then establishes a session with endpoint C (S6) and disconnects endpoint B (S7-S8).

FIG. 4-A is a call flow diagram that illustrates an example operation in which CCM receives a SIP REFER request with a Replaces header targeting a SIP endpoint. In FIG. 4-A, endpoint A is an H.323 endpoint. Endpoint B and endpoint C are SIP endpoints. Endpoint A and endpoint B have established a call signaling session through CCM. Endpoint B and endpoint C have established an independent CCM session through a SIP trunk. Accordingly, CCM does not know anything about the dialog that endpoint B has specified for the INVITE/Replaces request buried in the REFER message (S1). In this example, CCM chooses to intercept the received REFER (S2) and, rather than mapping it to some other protocol message, process the requested redirection locally. This results in the dissociation of endpoint A with endpoint B (step 400) within CCM, resulting in a media disconnection event (H1-H6 and S3-S5), followed by analysis of the Refer-To address-of-record (AOR) and subsequent INVITE to endpoint C (S6). Upon answer (S7), CCM negotiates a media connection between endpoint A (H7-17) and endpoint C (S8).

FIG. 4-B is a call flow diagram that illustrates an example operation in which CCM receives a SIP REFER request without a Replaces header. In this example, endpoint B is performing some immediate diversion to C, which is not currently in any session. Endpoint C answers the incoming call automatically. The operation is substantially the same as that described above with reference to FIG. 4-A, without a Replaces header in S1 or S6.

FIG. 5 is a call flow diagram that illustrates an example operation in which CCM receives a SIP REFER with a Replaces header targeting a non-SIP, CCM-managed endpoint. In FIG. 5, endpoint A and endpoint C are H.323 endpoints, and endpoint B is a SIP endpoint. Endpoint A and endpoint B are connected, but the media session is currently suspended. Normally, a received REFER results in an outgoing INVITE with the preferences specified within the REFER. The Replaces header indicates that the outgoing call offer should usurp one of the dialogs on the targeted device. CCM, however, may manage many devices, and if the REFER target does not support SIP, it does not have the capability to receive an INVITE. Furthermore, CCM is the entity managing the call leg to be usurped. In accordance with certain aspects of the present invention, then, CCM examines the identity of the REFER target; analyzes the AOR, which targets the CCM itself, since the device is CCM-managed; intercepts the call request and extracts the dialog id of the call leg to be usurped; dissociates the two parties on the call, resulting in a media disconnection event; and associates the REFERee to the REFER target, resulting in a media connection event. As illustrated in greater detail in FIG. 5, CCM receives a SIP REFER request with a Replaces header (S1) from endpoint B. REFER request Si targets endpoint C. CCM intercepts the request, sending an ACCEPTED message (S2) to endpoint B. CCM then internally dissociates endpoint A from endpoint B (step 500), and internally dissociates endpoint B from endpoint C (step 502). CCM suspends the media session with endpoint C (H1-H6) and with endpoint B (S3-S5). CCM then internally associates endpoint A with endpoint C (step 504). Finally, CCM establishes a media connection with endpoint A and with endpoint C (H7-H28).

FIG. 6 is a call flow diagram that illustrates an alternative embodiment of the present invention. In FIG. 6, communication platform 50 is a CCM. Unlike the previously described embodiment, though, endpoint A has not established a communication session with any other endpoint. Rather, in FIG. 6, CCM receives an "out-of-dialog" REFER. An out-of-dialog REFER is a REFER request that is sent outside of the context of an established dialog. Such REFER requests are a method of third-party call control in that they request the REFERee establish a new session. A REFER request includes a first resource identifier associated with the REFERee and a second resource identifier associated with the target of the REFER request. In certain embodiments, a resource identifier is commonly a Uniform Resource Indicator (URI). The URI specified by the REFER may represent either a SIP or non-SIP endpoint, and the Refer-To target in the REFER may specify a SIP or a non-SIP endpoint. At step 600, CCM intercepts the REFER and at step 601 analyzes the request resource identifier to identify an appropriate protocol for communicating with the endpoint associated with the resource identifier. At step 602, it originates the appropriate session setup request to the endpoint associated with the AOR in the URI (e.g., INVITE, H.225 SETUP, ISDN SETUP, StationSetRinger). At step 604, CCM waits for the specified device to provide media control information and answer.

Finally, in steps 606-608, CCM analyzes the Refer-To URI in the REFER and redirects the established session to the endpoint associated with the AOR in that URI.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for redirecting a session established between a first endpoint and a second endpoint, wherein the first endpoint and the second endpoint are associated in a communication platform; the method comprising:
   receiving a Session Initiation Protocol (SIP) request to redirect the session to a third endpoint;
   instead of mapping the SIP request to a message of a different protocol, processing, by a call manager, the SIP request to initiate disassociation of the first endpoint from the second endpoint; endpoint even if the third endpoint is an H.323 endpoint;
   suspending a media session between the first endpoint and the second endpoint;
   determining whether the third endpoint is a SIP endpoint or a non-SIP endpoint;
   suspending an established a second media session established between the second endpoint and the third endpoint if the third endpoint is a non-SIP endpoint, and sending a SIP message to the third endpoint to disconnect the second media session if the third endpoint is a SIP endpoint;
   after disassociating the first endpoint from the second endpoint, associating the first endpoint and the third endpoint by connecting a signaling session between the first endpoint and the third endpoint; and
   connecting the media session between the first endpoint and the third endpoint.

2. The method of claim 1, wherein the first endpoint is an H.323 endpoint.

3. The method of claim 2, wherein the step of suspending the media session comprises sending an Empty Capability Set message and a Close Logical Channel message to the H.323 endpoint.

4. The method of claim 3, wherein the second endpoint is a SIP endpoint; wherein the third endpoint is a SIP endpoint; wherein the SIP request is an INVITE request having a Replaces header that identifies the third endpoint as a target; wherein the step of suspending the media session further comprises sending a second INVITE request to the second endpoint specifying an inactive session descriptor; and wherein the step of connecting the media session comprises sending to the third endpoint a SIP message accepting the INVITE request, and sending to the first endpoint a Terminal Capability Set message and an Open Logical Channel message.

5. The method of claim 3, wherein the second endpoint is a SIP endpoint; wherein the third endpoint is a SIP endpoint; wherein the SIP request is a REFER request specifying the third endpoint as a target; wherein the step of suspending the media session further comprises sending a first INVITE request to the second endpoint specifying an inactive session descriptor; and wherein the step of connecting the media session comprises sending to the third endpoint a second INVITE request, and sending to the first endpoint a Terminal Capability Set message and an Open Logical Channel message.

6. The method of claim 3, wherein the second endpoint is a SIP endpoint; wherein the third endpoint is a SIP endpoint; wherein the second endpoint and the third endpoint have a second session established; wherein the SIP request is a REFER request having a Replaces header specifying the third endpoint as a target; wherein the step of suspending the media session further comprises sending a first INVITE request to the second endpoint specifying an inactive session descriptor; and wherein the step of connecting the media session comprises sending to the third endpoint a second INVITE request specifying the second session in a Replaces header, and sending to the first endpoint a Terminal Capability Set message and an Open Logical Channel message.

7. The method of claim 2, wherein the second endpoint is a SIP endpoint; wherein the third endpoint is an H.323 endpoint; wherein the second endpoint and the third endpoint have the second media session established; wherein the SIP request is a REFER request having a Replaces header specifying the third endpoint as a target; wherein the step of suspending the media session comprises sending an INVITE request to the second endpoint specifying an inactive session descriptor; further comprising suspending the second media session by sending an Empty Capability Set message and a Close Logical Channel message to the third endpoint; and wherein the step of connecting the media session comprises sending to the first and the third endpoints a Terminal Capability Set message and an Open Logical Channel message.

8. A system for redirecting a session established between a first endpoint and a second endpoint, wherein the first endpoint and the second endpoint are associated in a communication platform; the system comprising:
   a receiver component of a call manager operable to receive a Session
   Initiation Protocol (SIP) request to redirect the session to a third endpoint; and
   a processing component of the call manager operable to instead of mapping the SIP request to a message of a different protocol, process the SIP request to initiate disassociation of the first endpoint from the second endpoint even if the third endpoint is an H.323 endpoint, suspend a media session between the first endpoint and the second endpoint, connect a signaling session between the first endpoint and the third endpoint, determine whether the third endpoint is a SIP endpoint or a non-SIP endpoint, suspend a second media session established between the second endpoint and the third endpoint if the third endpoint is a non-SIP endpoint, send a SIP message to the third endpoint to disconnect the second media session if the third endpoint is a SIP endpoint, and after disassociating the first endpoint from the second endpoint, associate the first endpoint and the third endpoint by connecting the media session between the first endpoint and the third endpoint.

9. The system of claim 8, wherein the first endpoint is an H.323 endpoint.

10. The system of claim 9, wherein the processing component suspends the media session by sending an Empty Capability Set message and a Close Logical Channel message to the H.323 endpoint.

11. The system of 10, wherein the second endpoint is a SIP endpoint; wherein the third endpoint is a SIP endpoint; wherein the SIP request is an INVITE request having a Replaces header that identifies the third endpoint as a target; wherein the processing component further suspends the media session by sending a second INVITE request to the second endpoint specifying an inactive session descriptor; and wherein the processing component connects the media session by sending to the third endpoint a SIP message accepting the INVITE request, and sending to the first endpoint a Terminal Capability Set message and an Open Logical Channel message.

12. The system of claim 10, wherein the second endpoint is a SIP endpoint; wherein the third endpoint is a SIP endpoint; wherein the SIP request is a REFER request specifying the third endpoint as a target; wherein the processing component further suspends the media session by sending a first INVITE request to the second endpoint specifying an inactive session descriptor; and wherein the processing component connects the media session by sending to the third endpoint a second INVITE request, and sending to the first endpoint a Terminal Capability Set message and an Open Logical Channel message.

13. The system of claim 10, wherein the second endpoint is a SIP endpoint; wherein the third endpoint is a SIP endpoint; wherein the second endpoint and the third endpoint have a second session established; wherein the SIP request is a REFER request having a Replaces header specifying the third endpoint as a target; wherein the processing component further suspends the media session by sending a first INVITE request to the second endpoint specifying an inactive session descriptor; and wherein the processing component connects the media session by sending to the third endpoint a second INVITE request specifying the second session in a Replaces header, and sending to the first endpoint a Terminal Capability Set message and an Open Logical Channel message.

14. The system of claim 9, wherein the second endpoint is a SIP endpoint; wherein the third endpoint is an H.323 endpoint; wherein the second endpoint and the third endpoint have the second media session established; wherein the SIP request is a REFER request having a Replaces header specifying the third endpoint as a target; wherein the processing component suspends the media session by sending an INVITE request to the second endpoint specifying an inactive session descriptor, and is further operable to suspend the second media session by sending an Empty Capability Set message and a Close Logical Channel message to the third endpoint; and wherein the processing component connects the media session by sending to the first and the third endpoints a Terminal Capability Set message and an Open Logical Channel message.

15. Software embodied in a non-transitory computer-readable medium comprising computer code such that when executed by a processor, is operable to:
receive a Session Initiation Protocol (SIP) request to redirect a session between a first endpoint and a second endpoint to a third endpoint; and
instead of mapping the SIP request to a message of a different protocol, process, by a call manager, the SIP request to initiate disassociation of the first endpoint from the second endpoint in a communication platform even if the third endpoint is an H.323 endpoint;
suspend a media session between the first endpoint and the second endpoint;
determine whether the third endpoint is a SIP endpoint or a non-SIP endpoint;
suspend a second media session established between the second endpoint and the third endpoint if the third endpoint is a non-SIP endpoint, and send a SIP message to the third endpoint to disconnect the second media session if the third endpoint is a SIP endpoint;
after disassociating the first endpoint from the second endpoint, associate the first endpoint and the third endpoint by connecting a signaling session between the first endpoint and the third endpoint; and
connect the media session between the first endpoint and the third endpoint.

16. The software of claim 15, wherein the first endpoint is an H.323 endpoint.

17. The software of claim 16, wherein the code is operable to suspend the media session by sending an Empty Capability Set message and a Close Logical Channel message to the H.323 endpoint.

18. The software of claim 17, wherein the second endpoint is a SIP endpoint; wherein the third endpoint is a SIP endpoint; wherein the SIP request is an INVITE request having a Replaces header that identifies the third endpoint as a target; wherein the code is further operable to suspend the media session by sending a second INVITE request to the second endpoint specifying an inactive session descriptor; wherein the code is further operable to connect the media session by sending to the third endpoint a SIP message accepting the INVITE request and sending to the first endpoint a Terminal Capability Set message and an Open Logical Channel message.

19. The software of claim 17, wherein the second endpoint is a SIP endpoint; wherein the third endpoint is a SIP endpoint; wherein the SIP request is a REFER request specifying the third endpoint as a target; wherein the code is operable to suspend the media session by sending a first INVITE request to the second endpoint specifying an inactive session descriptor; and wherein the code is operable to connect the media session by sending to the third endpoint a second INVITE request, and sending to the first endpoint a Terminal Capability Set message and an Open Logical Channel message.

20. The software of claim 17, wherein the second endpoint is a SIP endpoint; wherein the third endpoint is a SIP endpoint; wherein the second endpoint and the third endpoint have a second session established; wherein the SIP request is a REFER request having a Replaces header specifying the third endpoint as a target; wherein the code is operable to suspend the media session by sending a first INVITE request to the second endpoint specifying an inactive session descriptor; and wherein the code is operable to connect the media session by sending to the third endpoint a second INVITE request specifying the second session in a Replaces header, and sending to the first endpoint a Terminal Capability Set message and an Open Logical Channel message.

21. The software of claim 16, wherein the second endpoint is a SIP endpoint; wherein the third endpoint is an H.323 endpoint; wherein the second endpoint and the third endpoint have the second media session established; wherein the SIP request is a REFER request having a Replaces header specifying the third endpoint as a target; wherein the code is operable to suspend the media session by sending an INVITE request to the second endpoint specifying an inactive session descriptor, and is further operable to suspend the second media session by sending an Empty Capability Set message and a Close Logical Channel message to the third endpoint; and wherein the code is operable to connect the media session by sending to the first and the third endpoints a Terminal Capability Set message and an Open Logical Channel message.

22. A system for redirecting a session established between a first endpoint and a second endpoint, wherein the first endpoint and the second endpoint are associated in a communication platform; the system comprising:
means for receiving a Session Initiation Protocol (SIP) request to redirect the session to a third endpoint;
means for instead of mapping the SIP request to a message of a different protocol, processing, by a call manager, the SIP request to initiate disassociation of the first endpoint from the second endpoint even if the third endpoint is an H.323 endpoint;

means for suspending a media session between the first endpoint and the second endpoint;

means for determining whether the third endpoint is a SIP endpoint or a non-SIP endpoint;

means for suspending a second media session established between the second endpoint and the third endpoint if the third endpoint is a non-SIP endpoint, and sending a SIP message to the third endpoint to disconnect the second media session if the third endpoint is a SIP endpoint;

means for, after disassociating the first endpoint from the second endpoint, associating the first endpoint and the third endpoint by connecting a signaling session between the first endpoint and the third endpoint; and means for connecting the media session between the first endpoint and the third endpoint.

* * * * *